J. F. BENDER & G. W. ANNE.
Blowing-Machines.

No. 146,507. Patented Jan. 20, 1874.

Witnesses.  Inventors.
W. B. Wiley  Jacob F. Bender
Jacob Stauffer  George W. Anne

UNITED STATES PATENT OFFICE.

JACOB F. BENDER AND GEORGE W. ANNE, OF LANCASTER, PENNSYLVANIA, ASSIGNORS TO RICHARD BLICKENDERFER, ADAM S. KELLER, AND JACOB F. BENDER, OF SAME PLACE.

IMPROVEMENT IN BLOWING-MACHINES.

Specification forming part of Letters Patent No. 146,507, dated January, 20 1874; application filed December 1, 1873.

*To all whom it may concern:*

Be it known that we, JACOB F. BENDER and GEORGE W. ANNE, of the city of Lancaster, in the State of Pennsylvania, have invented certain Improvements in Blowing-Machines, of which the following is a specification:

Our invention consists in our improved fan, in which the six or more flat curved wings are not only braced diagonally one to the other, but said braces consist of open conic tubes, in such a manner as to draw in the air centrally, concentrate and expel it with redoubled efficacy from and upon the outer portion of said wings, and thereby greatly augmenting the power of the machine as a whole.

The accompanying drawing will illustrate our improvement, in which—

Figure 1:
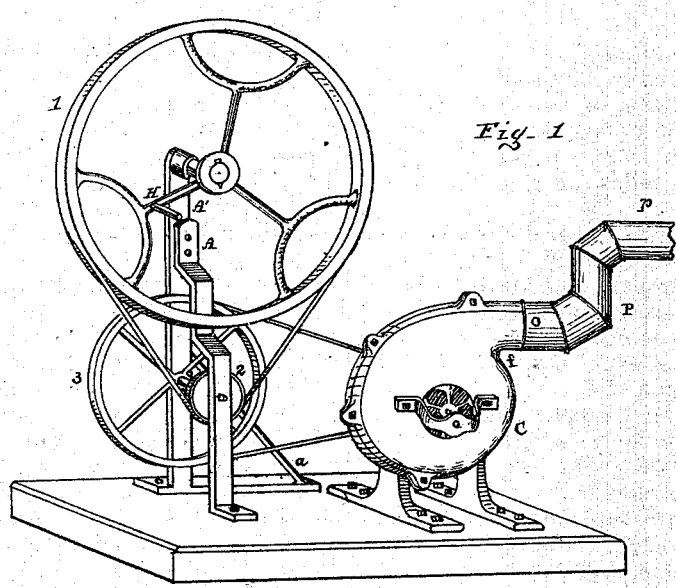
Figures 2, 3:
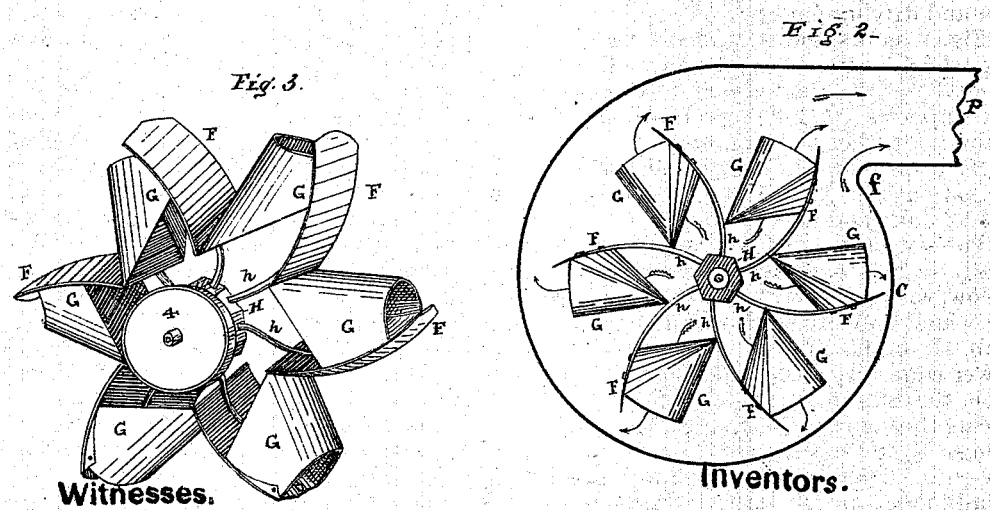

Figure 1 represents the fan-case and arrangement of the gearing. Fig. 2 is a plan view of the fan-wings, tubular braces, and fan-case. Fig. 3 is a perspective view of the fan and driving-pulley.

Fig. 1 shows the arrangement of the driving-wheel 1 with its handle H, pulley 2, belt-wheel 3 to drive the fan-pulley 4, together with the supports A' A for the bearings, as to require no further explanation.

By inspection of Figs. 2 and 3, a brief explanation will enable any one skilled in the art to make and use the same.

The six flat wings F are firmly attached centrally to rods $h$, flattened above and rounded below, with a screw-thread cut upon the ends, by which they are secured on, or to, a central hub, H, on the fan-shaft, so that the inner or lower edge of the wings is a sufficient distance from the hub to receive or admit the air entering through the opening of the case. These wings F are successively braced, each along its entire inner edge, by a plate carried diagonally across and upward with the sides curved in, and attached to the back or concave side of the next wing, near their outer terminus and partially down their outer edges, or both sides, thus forming a kind of tubular connection, open at both ends, as shown by G, Fig. 3. Thus, each wing from its inner edge of the convex side, is braced to the upper sides of the next wing on its concave side or face, constituting conic tubular braces; these being open across the entire width of the wings admit the air freely. When rapid motion is imparted to them it tends to pack or condense the gathered air, which is, necessarily, forced out with greater or increased energy through the outer open ends, striking the upper projecting concave edge or end of the wings in part in the direction of their motion, (shown by the arrows in Fig. 2,) and the outer edges of the wings are in close contact with the sides of the case $c$, and their outer or circumferential edges come equally close to the inner circumference of the case, at a point, $f$, just below its outlet into the pipe P, from which point the space is somewhat gradually enlarged within the case, as shown by Fig. 2.

Thus, we do not only utilize all the known advantages heretofore employed on a diversity of machines, but we add a new and important feature in combination with them, which results, collectively taken, in a superior or highly improved blowing-machine.

We are aware that there is no novelty in multiplying gear to gain speed; nor in the use of central pivot-bearings, adjustable with jam-nuts, to lessen friction, as such are used in various modes, and for divers purposes; and, hence, we do not claim those as our invention; but we do arrange them in a new form in connection with our fan, which results in certain advantages, and in perfecting the operation of our machine as a whole; therefore What we desire to secure by Letters Patent is—

The combination of the curved flat wings F with the open conic tubular braces G, constructed and operating substantially in the manner and for the purpose specified.

JACOB F. BENDER.
GEORGE W. ANNE.

Witnesses:
WM. B. WILEY,
JACOB STAUFFER.